(12) United States Patent
Jiang (10) Patent No.: US 9,985,566 B2
(45) Date of Patent: May 29, 2018

(54) DUAL THREE-PHASE ELECTRICAL MACHINE AND DRIVE WITH NEGLIGIBLE COMMON-MODE NOISE

(71) Applicant: OTIS ELEVATOR COMPANY, Farmington, CT (US)

(72) Inventor: Dong Jiang, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days. days.

(21) Appl. No.: 15/131,543

(22) Filed: Apr. 18, 2016

(65) Prior Publication Data

US 2016/0352278 A1 Dec. 1, 2016

Related U.S. Application Data

(60) Provisional application No. 62/168,186, filed on May 29, 2015.

(51) Int. Cl.
*G05B 11/28* (2006.01)
*H02P 25/22* (2006.01)
*H02P 27/08* (2006.01)
*B66B 1/30* (2006.01)
*H02M 7/493* (2007.01)
*H02M 1/44* (2007.01)
*H02M 1/12* (2006.01)

(52) U.S. Cl.
CPC .............. *H02P 25/22* (2013.01); *B66B 1/308* (2013.01); *H02M 7/493* (2013.01); *H02P 27/08* (2013.01); *H02M 1/44* (2013.01); *H02M 2001/123* (2013.01)

(58) Field of Classification Search
USPC ............. 318/496, 599, 122; 363/39, 41, 104
See application file for complete search history.

(56) References Cited

U.S. PATENT DOCUMENTS

| 4,441,064 A | 4/1984 | Cutler et al. |
| 5,648,894 A | 7/1997 | Dedoncker et al. |
| 5,852,558 A | 12/1998 | Julian et al. |
| 6,040,989 A | 3/2000 | Thorn et al. |
| 6,236,583 B1 * | 5/2001 | Kikuchi .................. H02P 27/06 318/801 |
| 6,337,803 B2 | 1/2002 | Kikuchi et al. |
| 6,392,905 B1 | 5/2002 | Huang et al. |
| 6,486,632 B2 | 11/2002 | Okushima et al. |
| 7,046,527 B2 | 5/2006 | West |
| 7,342,330 B2 | 3/2008 | Sakamoto et al. |

(Continued)

FOREIGN PATENT DOCUMENTS

| DE | 102007040166 A1 | 6/2009 |
| EP | 1052769 A2 | 11/2000 |
| WO | 2014182272 A1 | 11/2014 |

OTHER PUBLICATIONS

Zhihong Ye et al: "Paralleling non-isolated multi-phase PWM converters", Industry Applications Conference, 2000. Conference Record of the 2000 IEEE Oct. 8-12, 2000, Iscataway, NJ, USA,IEEE, vol. 4, Oct. 8, 2000 (Oct. 8, 2000), pp. 2433-2439, XP010522596, ISBN: 978-0-7803-6401-1.*

(Continued)

*Primary Examiner* — Jorge L Carrasquillo
(74) *Attorney, Agent, or Firm* — Cantor Colburn LLP (57) ABSTRACT

A system and/or method for controlling a dual-three-phase machine with respect to a power electronics inverter is provided. The dual-three-phase machine includes six phase windings divided into at least two windings groups configured to provide a combination of six voltages that achieve zero common-mode voltage and a significantly reduced common-mode noise current.

10 Claims, 9 Drawing Sheets

(56) References Cited

U.S. PATENT DOCUMENTS

| | | | |
|---|---|---|---|
| 7,372,712 B2 | 5/2008 | Stancu et al. | |
| 7,868,573 B2 | 1/2011 | Lewis | |
| 7,956,563 B2* | 6/2011 | Perisic | B60L 11/1868 180/65.1 |
| 7,990,098 B2* | 8/2011 | Perisic | B60L 11/1868 318/432 |
| 8,928,264 B2 | 1/2015 | Tangiguchi | |
| 2006/0192520 A1* | 8/2006 | Yin | H02M 7/53873 318/802 |
| 2010/0071970 A1* | 3/2010 | Welchko | B60K 1/00 180/65.1 |
| 2015/0349626 A1* | 12/2015 | Jiang | H02M 1/44 363/39 |
| 2016/0083226 A1* | 3/2016 | Piech | B66B 11/0407 187/250 |
| 2016/0329705 A1* | 11/2016 | Lacaux | H02M 1/126 |

OTHER PUBLICATIONS

Di Zhang et al: "Common-Mode Circulating Current Control of Paralleled Interleaved Three-Phase Two-Level Voltage-Source Converters With Discontinuous Space-Vector Modulation", IEEE Transactions on Power Electronics, Institute of Electrical and Electronics Engineers, USA, vol. 26, No. ,12, Dec. 1, 2011 (Dec. 1, 2011), pp. 3925-3935, XP011479936.*

Oriti G et al: "An inverter/motor drive with common mode voltage elimination", Industry Applications Conference, 1997. Thirty-Second IAS Annual Meeting, IAS '97., Conference Record of the 1997 IEEE New Orleans, LA, USA Oct. 5-9, 1997, New York, NY, USA,IEEE, US, vol. 1, Oct. 5, 1997 (Oct. 5, 1997), pp. 587-592, XP010248630.*

Di Zhang, et al., "Common-Mode Circulating Current Control of Paralleled Interleaved Three-Phase Two-Level Voltage-Source Converters With Discontinuous Space-Vector Modulation", IEEE Transactions on Power Electronics, vol. 26, No. 12, Dec. 2011, pp. 3925-3935.

EPSR for EP Application No. 16171358.1, dated Nov. 22, 2016, 11 pages.

G. Oriti, et al., "An Inverter/Motor Drive With Common Mode Voltage Elimination", IEEE Industry Application Society Annual Meeting, New Orleans, Louisiana, Oct. 5-9, 1997, pp. 587-592.

Zhihong Ye, et al., "Paralleling Non-Isolated Multi-Phase PWM Converters", Center for Power Electronics Systems, Virginia Polytechnic Institute and State University, Blacksburg, VA, IEEE, 2000, pp. 2433-2439.

* cited by examiner

DUAL THREE-PHASE ELECTRICAL MACHINE AND DRIVE WITH NEGLIGIBLE COMMON-MODE NOISE

DOMESTIC PRIORITY

This application is a Non-Provisional Application of U.S. Application No. 62/168,186, filed on May 29, 2015, the disclosure of which is incorporated by reference herein in its entirety.

BACKGROUND

The subject matter disclosed herein relates generally to the field of elevators, and more particularly to elevator power systems.

An elevator system, such as traction, hydraulic, and self-propelled elevator systems, based on the application (e.g., high rise buildings) can utilize a power system to propel a car within an elevator shaft. At present, the power system can employ a power electronics inverter (e.g., as variable speed alternating drive (AC) motor drive) to improve performance of the power system. However, switching of power electronics devices in power system includes inherent electromagnetic interference (EMI) problems.

In general, EMI noise can be divided into two major groups: differential mode (DM) noise and common-mode (CM) noise. DM noises are conducted between phases. CM noises are conducted together with all phases through the parasitic capacitors to the ground. CM noises are with serious concern for motor drives because CM noises increase the EMI in the motor drive and damage the motor bearing and winding insulation. Unfortunately, in certain applications, solutions such as adding CM filters to attenuate CM noises are not viable due to the significant weight penalty of each CM filter.

BRIEF DESCRIPTION

According to one embodiment, a power electronics system is provided. The power electronics system can comprise a power electronics converter configured as a motive drive and to provide pulse-width-modulation and a dual-three-phase machine comprising six phase windings divided into a first and second windings groups configured to result in a zero common-mode pulse width modulation across the at least two windings groups.

In the above embodiment, or in the alternative, each winding of the first windings groups can correspond to a winding of the second windings group.

In the above embodiments, or in the alternative, each winding of the first windings groups can be in-phase with a winding of the second windings group.

In the above embodiments, or in the alternative, the first and second windings groups can form a three-phase, 120° phase-shift machine.

In the above embodiments, or in the alternative, the power electronics system can further comprise a first neutral connection connecting the first windings group; and a second neutral connection connecting the second windings group, wherein the first neutral connection is separate from the second neutral connection.

In the above embodiments, or in the alternative, the first and second windings groups can be physically distributed in two segments of a stator of the power electronics system.

In the above embodiments, or in the alternative, the first and second windings groups can have an identical back-electro-magnetic-force for each winding pair.

In the above embodiments, or in the alternative, the power electronics system can further comprise a common-mode capacitor is between a common-neutral connection and a ground.

In the above embodiments, or in the alternative, the power electronics converter can be a paralleled inverter comprising a first inverter connected to the first windings group and a second inverter connected to the second windings group.

In the above embodiments, or in the alternative, the power electronics system can be included in a ropeless elevator system.

According to one embodiment, a method for controlling a dual-three-phase motor drive is provided. The method comprises generating, by a speed controller of the dual-three-phase motor, a reference current; generating, by a current controller of the dual-three-phase motor, a reference voltage based on the reference current; generating, by a zero-common mode pulse width modulation module of the dual-three-phase motor, two groups of pulse width modulated signals; providing the two groups of pulse width modulated signals to a paralleled inverter of the dual-three-phase motor; and driving, by the paralleled inverter, first and second windings groups of the dual-three-phase motor via the two groups of pulse width modulated signals.

In the above embodiment, or in the alternative, each winding of the first windings group can correspond to a winding of the second windings group.

In the above embodiments, or in the alternative, each winding of the first windings group can be in-phase with a winding of the second windings group.

In the above embodiments, or in the alternative, the first and second windings groups can form a three-phase, 120° phase-shift machine.

In the above embodiments, or in the alternative, the method can further comprise connecting each winding of the first windings group via a first neutral connection; and connecting each winding of the second windings group via a second neutral connection, wherein the first neutral connection is separate from the second neutral connection.

In the above embodiments, or in the alternative, the first and second windings groups can be physically distributed in two segments of a stator of the dual-three-phase motor.

In the above embodiments, or in the alternative, the first and second windings groups can have an identical back-electro-magnetic-force for each winding pair.

In the above embodiments, or in the alternative, the paralleled inverter can include a first inverter connected to the first windings group and a second inverter connected to the second windings group.

In the above embodiments, or in the alternative, the dual-three-phase motor can be included in a ropeless elevator system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The foregoing and other features, and advantages are apparent from the following detailed description taken in conjunction with the accompanying drawings in which:

FIG. 1 depicts a multicar elevator system in accordance with an embodiment of;

DETAILED DESCRIPTION

In general, embodiments herein relate to a dual-three-phase machine with respect to a power electronics inverter (e.g., a paralleled inverter) to minimize or eliminate common-code (CM) in a motor. Further, by coupling the dual-three-phase machine directly to the paralleled inverter any requirement for a coupling inductor is eliminated. This dual-three-phase machine can be employed in an elevator system (e.g., traction, hydraulic, and self-propelled elevator systems).

In one embodiment, the dual-three-phase machine is utilized in a power system of a ropeless elevator system, also referred to as self-propelled elevator system. For example, a linear motor system of the ropeless elevator system can employ a power electronics inverter (e.g., as variable speed alternating drive (AC) motor drive) to improve the performance of the linear motor system.

Figure 1:
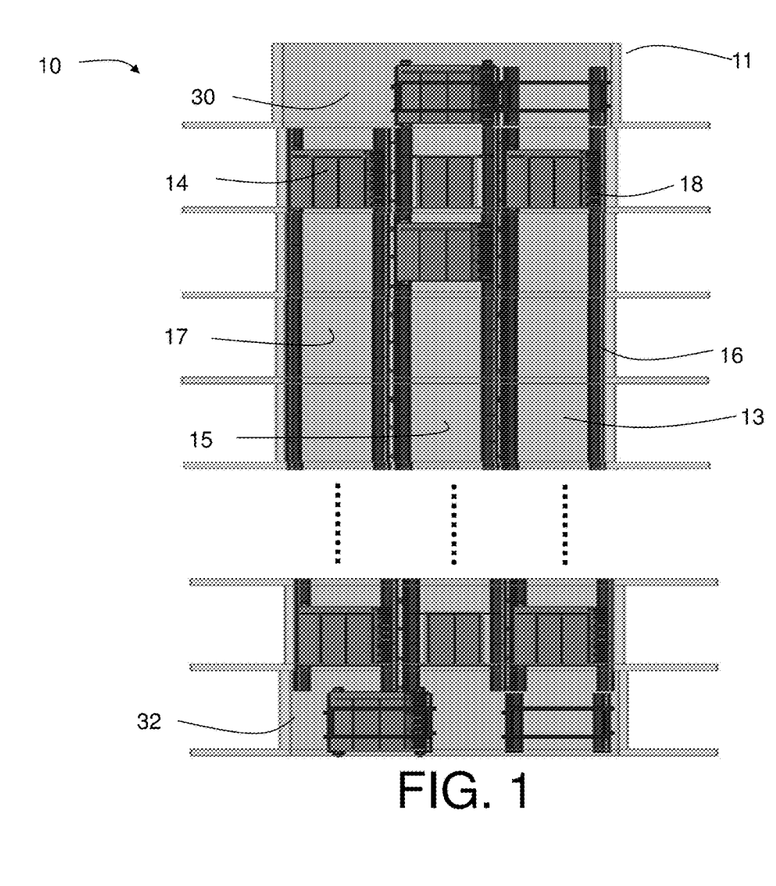

FIG. 1 depicts a multicar, ropeless elevator system 10 in an exemplary embodiment. Elevator system 10 includes a hoistway 11 having a plurality of lanes 13, 15 and 17. While three lanes are shown in FIG. 1, it is understood that embodiments may be used with multicar ropeless elevator systems that have any number of lanes. In each lane 13, 15, 17, cars 14 travel in one direction, i.e., up or down, or in multiple directions. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a motor and drive system (e.g., a linear motor system) having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

In another embodiment, the dual-three-phase machine is utilized in an electric motor system of a traction elevator system. The traction elevator system also includes a hoistway having a plurality of lanes or shafts. In each shaft, an elevator car travels in one direction, i.e., up or down. The electric motor system utilizes the power electronics inverter (e.g., as variable speed alternating drive (AC) motor drive) to improve the performance of maneuvering the elevator cars via cables.

Figure 2:
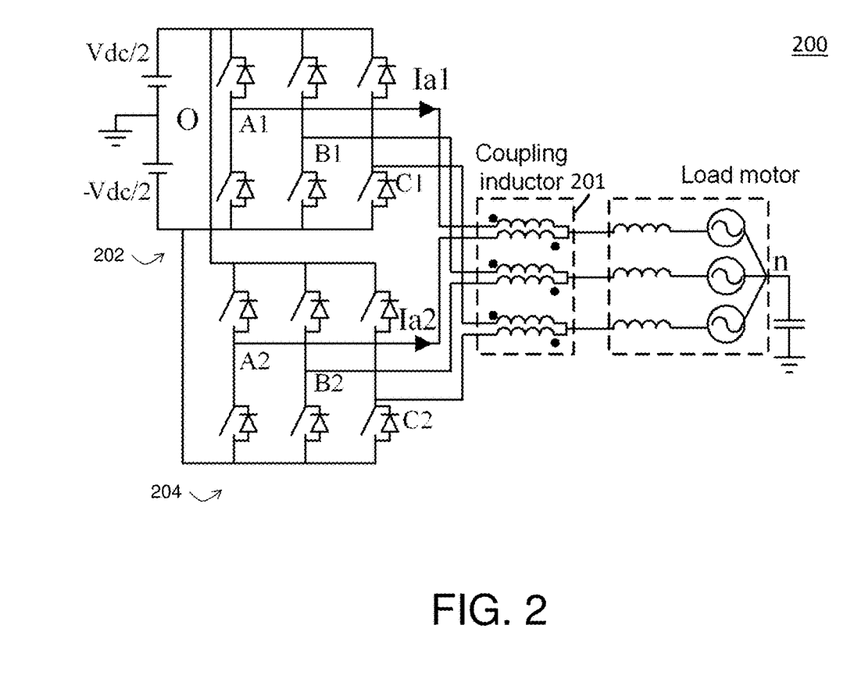
FIG. 2 shows of a three-phase paralleled inverter with a double-winding machine in accordance with an embodiment.

Turning to FIG. 2, a three-phase paralleled inverter architecture 200 is shown with coupling inductors 201 to limit a circulation current. The architecture 200 includes two three-phase converters 202, 204, each of which includes three pairs of switches. The two three-phase converters 202, 204 are parallel by being connected to a same side of a direct current (DC) bus (e.g., $V_{dc}/2$ and $-V_{dc}/2$) and by terminals A1, B1, C1 and A2, B2, C2 being connected to the coupling inductor 201.

In the three-phase paralleled inverter architecture 200, an output CM voltage can be kept to be zero and EMI noise can be significantly reduced for the load by arranging the 12 pulse-width modulation (PWM) signals of switches of the two three-phase converters 202, 204. However, for this three phase machine, external coupling inductor 201 is required for inverter paralleling. The coupling inductors 201 can limit the circulating current between two inverters with its mutual inductance, but increase a system volume and a system weight, and make the system more complex.

Figure 3:
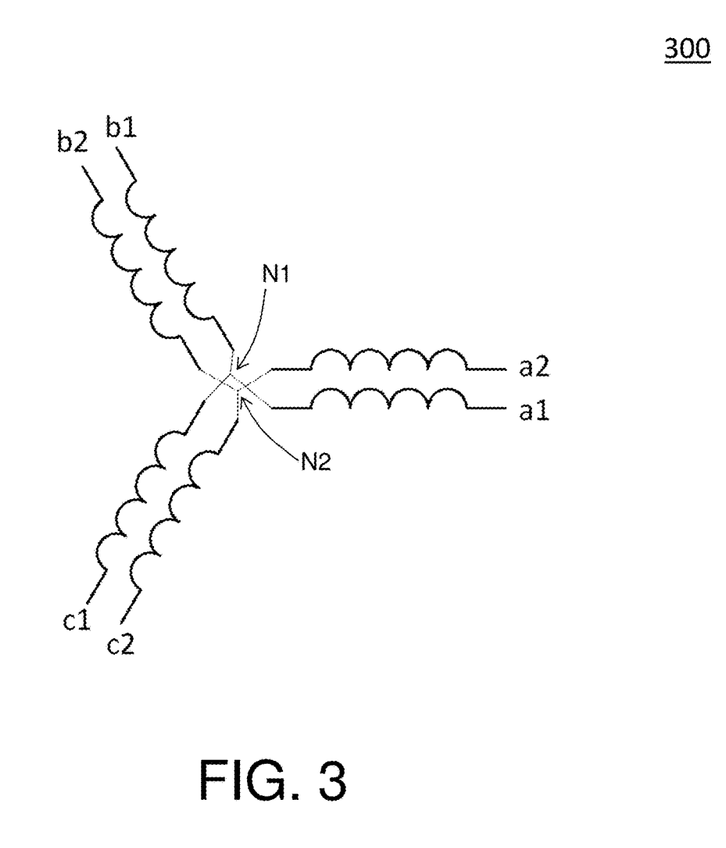
FIG. 3 illustrates a configuration of windings for a dual-three-phase machine in accordance with an embodiment.

Further, without paralleled inverters, three phase motor drives cannot be controlled with zero CM voltage due to an odd number of phases. With even number of phases, regular voltage source inverter (VSI) can be used as motor drive to achieve zero CM voltage theoretically. In this way, a dual-three-phase electrical machine can be driven by two three-phase inverters. Thus, embodiments are based on the dual-three-phase electrical machine with two three-phase inverters to achieve negligible CM noise. Compared with paralleled three-phase inverters for three-phase machine, no extra coupling inductor is needed for circulating current control. This part describes the novelty of this invention, by combining the coupling inductor's function in the existing motor winding and eliminate the coupling inductors in the previous UTAS patent FIG. 3 illustrates dual-three-phase machine windings 300 in accordance with an embodiment. In the dual-three-phase machine windings 300, two groups of three-phase windings are distributed with 120° differences in space. The first group of three-phase windings is a1-b1-c1. The second group of three-phase windings is a2-b2-c2. The two groups of windings form two three-phase, 120° phase-shift machines. Each pair of windings in the two groups (a1-a2, b1-b2, c1-c2) are in-phase with each other. The two neutral points N1 and N2 for the two groups of windings can be separated or connected. The two groups of windings are physically distributed in two segments of the stators, which results in little mutual inductance between the two windings in each pair (a1-a2, b1-b2, c1-c2). The two windings in each pair can have the identical back-electro-magnetic-force (back-EMF) so that they can be with the same reference voltage. This kind of winding arrangement is shown in FIG. 4.

Figure 4:
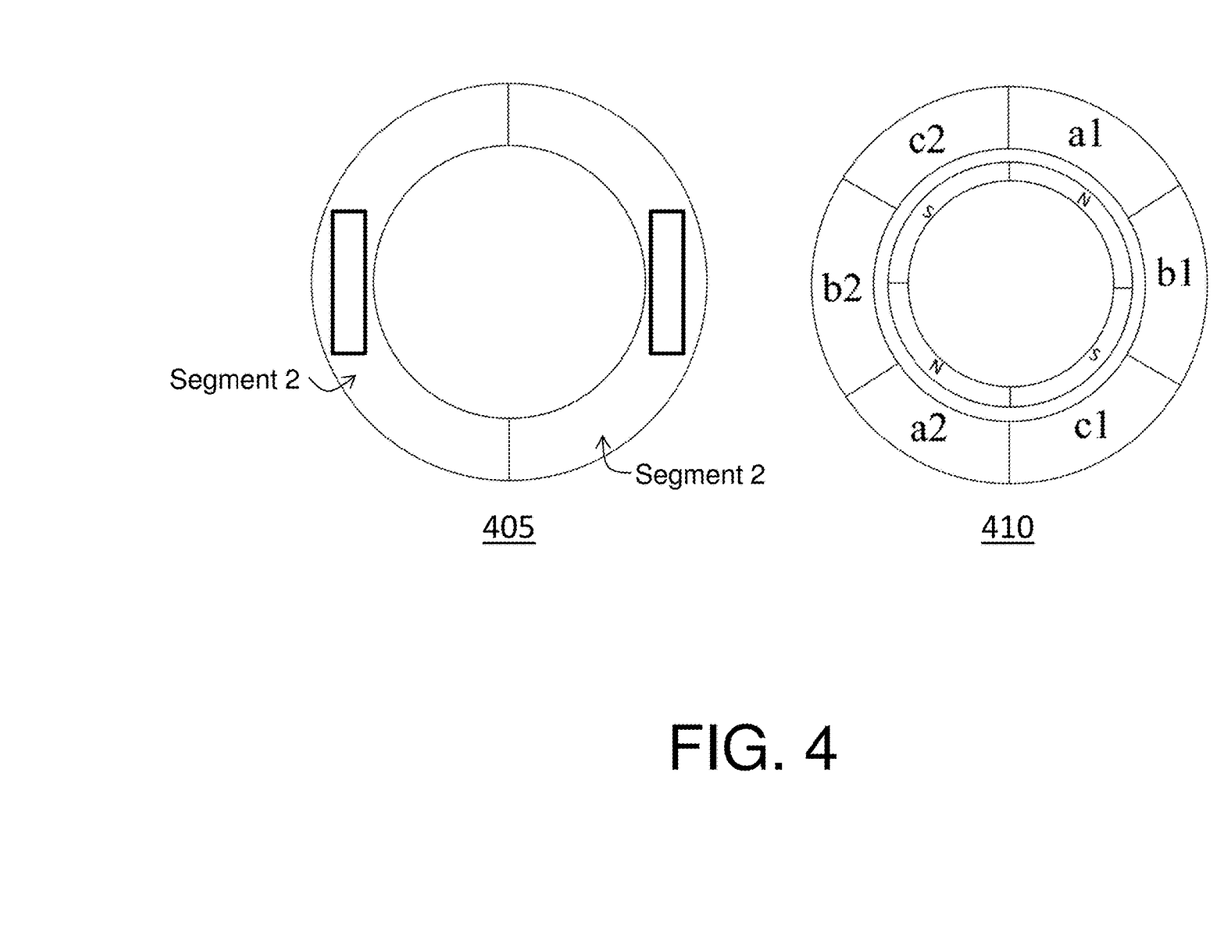
FIG. 4 illustrates a winding displacement in a dual-three-phase machine accordance with an embodiment.

FIG. 4 illustrates a winding arrangement in a dual-three-phase machine in accordance with an embodiment. Particularly, FIG. 4 illustrates a diagram 405 with two segments (e.g., Segment 1 and Segment 2) of a stator and a diagram 410 with the two groups of three-phase windings (e.g., a1-b1-c1 and a2-b2-c2) in these two segments. With the rotation of the rotor with permanent magnets, the back-EMF in each pair of windings will be the same. Also, advantageously, the mutual inductance between each pair of windings can be negligible in comparison with the self-inductance in each winding.

Figure 5:
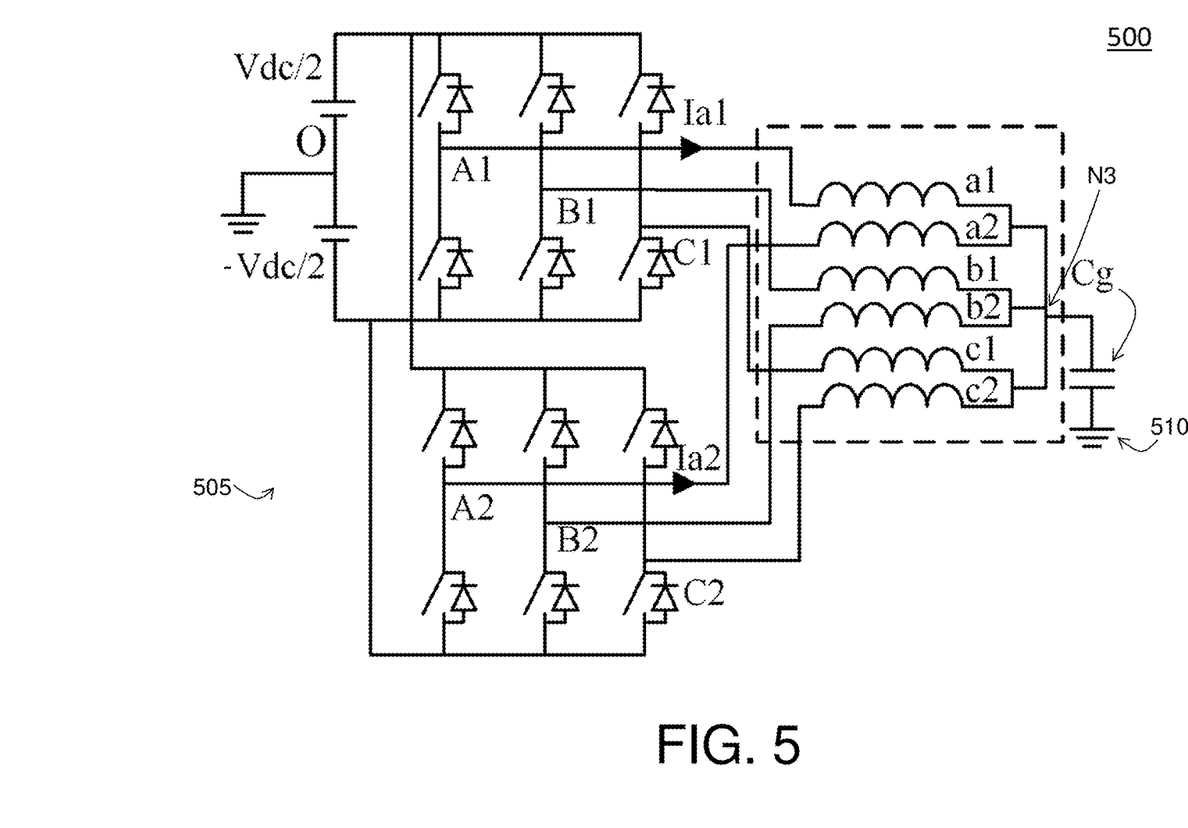
FIG. 5 illustrates a dual-three-phase machine with an inverter in accordance with embodiments.

FIG. 5 illustrates a circuit diagram of a dual-three-phase machine 500 with a paralleled inverter 505 in accordance with embodiments. The first inverter of the paralleled inverter 505 is connected to the windings a1, b1, c1 and the second inverter of the paralleled inverter 505 is connected to the windings a2, b2, c2. In general, this architecture of dual-three-phase machine 500, a mutual inductance is small and a main inductance of each pair of windings can work as circulating current limiter.

Further, the dual-three-phase machine 500 with the paralleled inverter 505 includes a common-neutral connection N3. The common-mode capacitor Cg is between the common-neutral connection N3 and the ground 510. Note that grounding/parasitic capacitor is a complex issue with respect to either a common neutral point for the two groups of three-phase windings or to separate neutral points for the two groups of three-phase windings. In both cases, the dual-three-phase machine 500 works to reduce the CM voltage and CM noise. In this way, the inverter terminal voltage can be modeled as pulse voltage to a DC mid-point by switching between the windings a1, b1, c1 and the windings a2, b2, c2. The common-mode voltage $V_{cm}$ of the dual-three-phase machine 500 driven by the paralleled inverter 505 is shown in equation (1).

$$V_{cm} = \frac{V_{A1} + V_{A2} + V_{B1} + V_{B2} + V_{C1} + V_{C2}}{6} \quad (1)$$

The common-mode voltage $V_{cm}$, will generate CM current through the parasitic capacitor Cg to ground 510. The inverter terminal voltages $V_{A1}, V_{A2}, V_{B1}, V_{B2}, V_{C1}, V_{C2}$ are switching between $V_{dc}/2$ (positive DC bus) and $-V_{dc}/2$ (negative DC bus). Thus, looking at the model, the contributions of the inverters include a measure of control over the machine 500 to cancel the common mode. That is, by properly arranging the combination of these six voltages, zero CM voltage can be achieved and CM noise current can be significantly reduced.

In view of the above, a concern for the dual-three-phase machine 500 driven by the paralleled inverter 505 is the circulating current in each pair of windings. That is, because the PWM voltages in each pair of windings are different, a circulating current is generated and the winding inductance is used to control it. To describe this concern, an equivalent circuit of FIG. 5 is shown, for example, in FIG. 6 in accordance with an embodiment.

Figure 6:
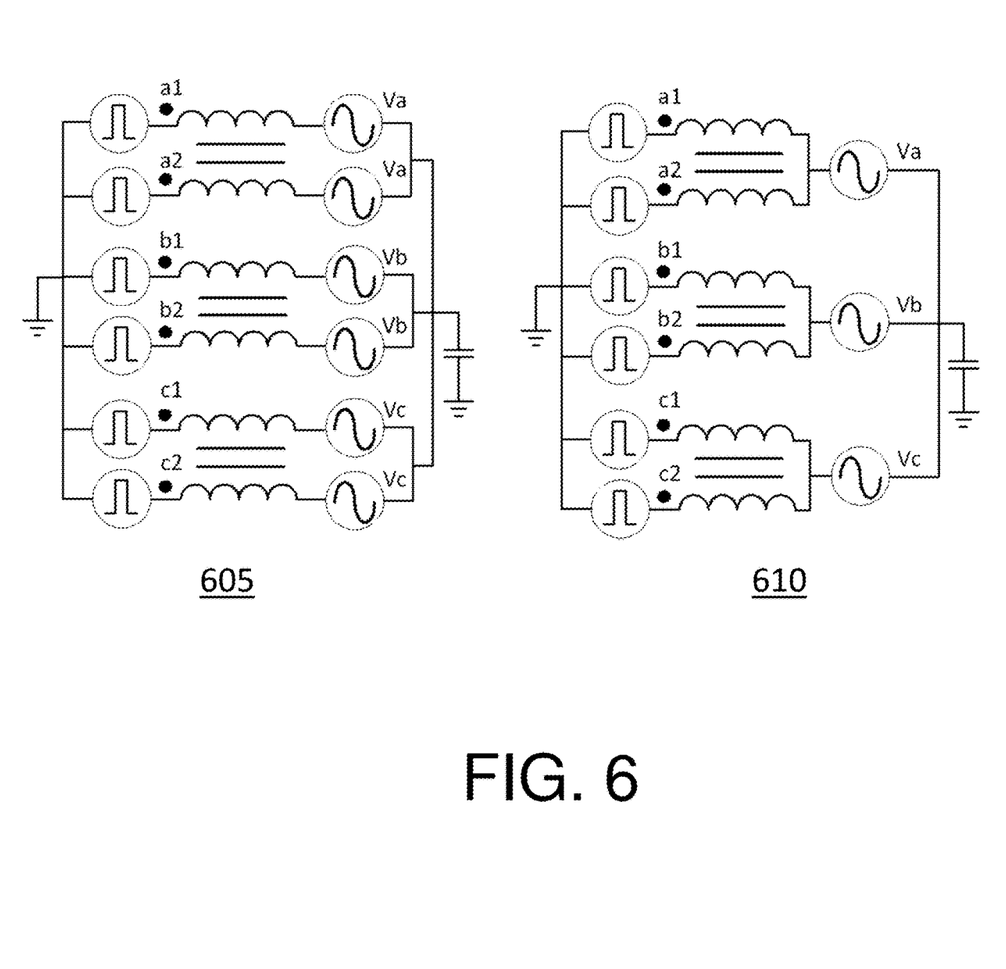
FIG. 6 illustrates equivalent circuits of an inverter driven dual-three-phase machine with respect to a separated back electromagnetic force (EMF) and a common back EMF in accordance with an embodiment.

FIG. 6 describes the principle of using a motor winding to work as coupling inductor and emphasizes that with little mutual inductance, the performance will be better. In general, if there is a coupling between two of winding groups, a circulating current will be flowing within the groups (e.g., from between the winding a1 and the winding a2). In turn, since the winding a1 and the winding a2 are coupled, inductances produced are very small and a circulating current is very large. In FIG. 6, a diagram 605 with respect to a separate back-EMF and a diagram 610 with respect to a common back-EMF are illustrated. The diagram 605 shows the equivalent circuit of the inverter driven dual-three-phase machine with modeling the back-EMF as voltage source.

Since the back-EMFs in each pair of windings are the same, they can be combined and diagram 605 can be modeled as a diagram 610. For example, because the winding a1 and the winding a2 have the same back-EMF Va and Va, because the winding b1 and the winding b2 have the same back-EMF Vb and Vb, and because the winding c1 and the winding c2 have the same back-EMF Vc and Vc, each pair of windings can be combined to have a three phase voltage Va, Vb, and Vc.

Thus, in the diagram 605, a series leakage inductance in each pair of windings (e.g., La1+La2, Lb1+Lb2, Lc1+Lc2) will work as circulating current limiter and paralleled inductance (e.g., La1//La2, Lb1//Lb2, Lc1//Lc2) will work as output inductance of the motor. Thus, with the architecture of dual-three-phase machine 500 as noted above, a mutual inductance is small and a main inductance of each pair of windings can work as circulating current limiter.

Figure 7:
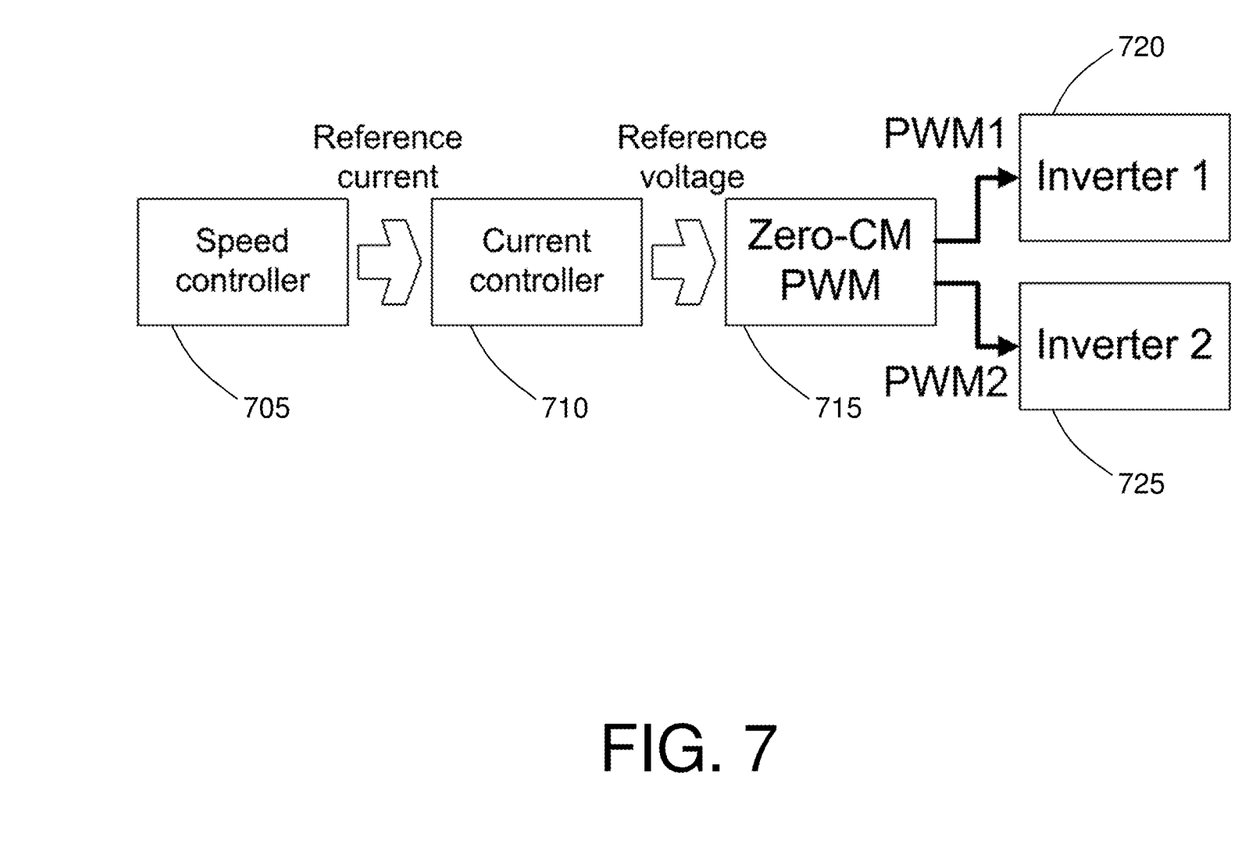
FIG. 7 illustrates controller structure of a dual-three-phase motor drive in accordance with an embodiment.

Turning now to FIG. 7, a controller structure 700 of a dual-three-phase motor drive is illustrated. Reference current is generated by the speed controller 705 and sent to the current controller 410. The feedback current of the dual-three-phase motor are transferred to the d-q axis and compared with the reference current. The reference voltage is generated from current controller and sent to the zero-CM PWM module 715. PWM 1 and 2 signals for the two inverters 720, 725 are calculated in the zero-CM PWM module 715 and sent to drive the two groups of windings.

Figure 8:
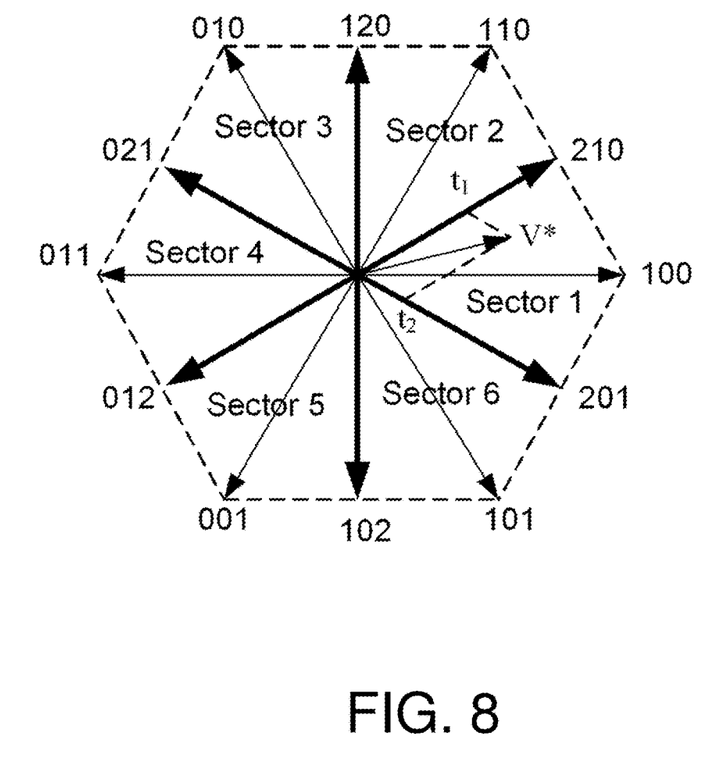
FIG. 8 illustrates voltage vectors for zero-common-mode paralleled inverters in accordance with an embodiment.
Figure 9:
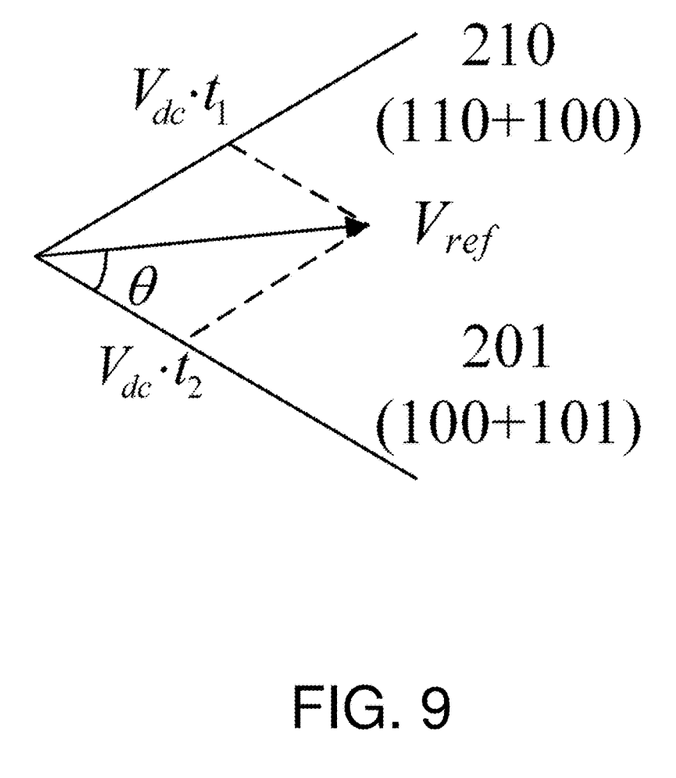
FIG. 9 illustrates a voltage vector combination in a sector (with sector 1 as an example) in accordance with an embodiment.

Turning now to FIGS. 8 and 9, FIG. 8 illustrates a principal of the zero-CM PWM module 715 and FIG. 9 shows the voltage vector combination in an example sector (e.g., sector 1 of FIG. 8).

In FIG. 8, each two adjacent voltage vectors (e.g., 100-110, 110-010, 010-011, 011-001, 001-101, 101-100) in inverter are combined to generate six new voltage vectors (e.g., 210, 120, 021, 012, 102, 201). With each new voltage vector, the output common-mode voltage will be kept to be zero. The reference voltage V* is combined by two adjacent new voltage vectors like normal space vector modulation (SVM). SVM is an algorithm for the control of PWM (i.e., SVPWM) used for the creation of alternating current (AC) waveforms; most commonly to drive three phase AC powered motors at varying speeds from DC source using multiple amplifiers. Then an active time for each new vector is distributed to the original voltage vectors in two inverters. In this way, the common-mode voltage of the paralleled inverter 505 can be eliminated and the common-mode EMI noise is significantly reduced. Also, because of the cancellation of the output voltage of the two inverters, the differential mode EMI noise and current ripple can also be reduced. Note that the new voltage vectors are with the length of 0.866 times of the original voltage vector, which modifies the modulation index from 1.15 to 1.

FIG. 9 shows the voltage vector combination in an example sector (e.g., sector 1). The active times for the two new vectors are t1 and t2. The reference voltage Vref is with position of angle θ and the switching period Ts. With the triangle relationship (2), t1 and t2 can be derived. The zero vector active time t0=Ts−t1−t2. Then the active time can be arranged to the two inverters and zero common-mode voltage is kept.

$$\frac{V_{ref}T_s}{\sin(2\pi/3)} = \frac{V_{dc}t_1}{\sin\theta} = \frac{V_{dc}t_2}{\sin(\pi/3 - \theta)} \quad (2)$$

Table. 1 shows the active time arrangement for zero-CM PWM for dual-three-phase motor drive in sector 1. In the first half of t1 period, the new voltage vector is with 2,1,0 in FIG. 8, inverter 1 is with 1,1,0 and inverter 2 is with 1,0,0. In the second half of t1 period, inverter 1 is with 1,0,0 and inverter 2 is with 1,1,0. Other voltage vectors can be arranged. This arrangement maintains the voltage balance of the two inverters in each switching cycle, as show.

TABLE 1

Active Time Arrangement For Zero-CM PWM For Two Inverters

|  | Inverter 1 | Inverter 2 |
|---|---|---|
| t0/4 | 1, 1, 1 | 0, 0, 0 |
| t1/2 | 1, 1, 0 | 1, 0, 0 |
| t2/2 | 1, 0, 0 | 1, 0, 1 |
| t0/2 | 0, 0, 0 | 1, 1, 1 |
| t1/2 | 1, 0, 0 | 1, 1, 0 |
| t2/2 | 1, 0, 1 | 1, 0, 0 |
| t0/4 | 1, 1, 1 | 0, 0, 0 |

In view of the above, simulations were executed to produce results of the CM voltage between normal SVPWM and the zero-CM PWM in the dual-three-phase motor drive (e.g., machine 500), these results being utilize to validate the above embodiments. With normal SVPWM, the CM voltage is switching with the amplitude of $V_{dc}/2$. With the zero-CM PWM, CM voltage is negligible. Additionally, simulations were executed to compare a torque between with normal SVPWM and zero-CM PWM for dual-three-phase motor drive. These simulations showed that there was a reduction of less torque ripple with the zero-CM PWM.

In view of the above, the technical effects and benefits of embodiments of the six-phase electrical machines with negligible common-mode (e.g., a drive and motor system and/or method for a dual-three-phase machine with respect to a power electronics inverter) include eliminating of common-mode voltage for the dual-three-phase motor drive, significantly reducing a CM EMI noise and a CM current, and reducing a CM current damage to the motor insulation and bearing. Further, compared with paralleled inverters for a three-phase motor drive, the technical effects and benefits include the elimination of a coupling inductor. Furthermore, a winding self-inductance is used to control a circulating current, a power density can be significantly increased by the elimination of a CM filter and the coupling inductors, and a DM noise and torque ripple can be reduced for the motor. Moreover, a multi-segment based motor stator structure significantly reduces the cross-coupling between windings, while a fault-tolerant capability is also improved.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of embodiments and the practical application, and to enable others of ordinary skill in the art to understand the various embodiments with various modifications as are suited to the particular use contemplated.

The invention claimed is:

1. A power electronics system, comprising:
    a power electronics converter configured as a motive drive and to provide pulse-width-modulation; and
    a dual-three-phase machine comprising the power electronics converter, a current controller, six phase windings divided into a first and second windings groups, a common-neutral connection connecting the six phase windings, and a common-mode capacitor,
    wherein the power electronics converter is a paralleled inverter comprising a first inverter connected to the first windings group and a second inverter connected to the second windings group,
    wherein the paralleled inverter is configured to provide a pulse-width-modulation as a motor drive to the six phase windings to generate a zero common-mode pulse width modulation across the first and second windings groups; and
    wherein the common-mode capacitor is between the common-neutral connection and a ground,
    wherein the common-neutral connection comprises a first neutral connection connecting the first windings group and a second neutral connection, which is separate from the second neutral connection, connecting the second windings group,
    wherein the zero common-mode pulse width modulation provided by the paralleled inverter utilizes a reference voltage generated by the current controller and comprises a triangle relationship defined by:

$$\frac{V_{ref}T_s}{\sin(2\pi/3)} = \frac{V_{dc}t_1}{\sin\theta} = \frac{V_{dc}t_2}{\sin(\pi/3 - \theta)},$$

where t1 and t2 are two vectors corresponding to the first and second windings groups, Vref is the reference voltage with a position of angle θ, and Ts is a switching period,
    wherein a voltage of the common-mode pulse width modulation is zero or negligible due to the triangle relationship,
    wherein each winding of the first windings groups corresponds to and is in-phase with a winding of the second windings group.

2. The power electronics system of claim 1, wherein the first and second windings groups form a three-phase, 120° phase-shift machine.

3. The power electronics system of claim 1, wherein the first and second windings groups are physically distributed in two segments of a stator of the power electronics system.

4. The power electronics system of claim 1, wherein the first and second windings groups have an identical back-electro-magnetic-force for each winding pair.

5. The power electronics system of claim 1, wherein the power electronics system is included in an elevator system.

6. A method for controlling a dual-three-phase motor machine comprising a speed controller, a current controller, a zero-common mode pulse width modulation module, a paralleled inverter, six phase windings divided into a first and second windings groups, a common-neutral connection connecting the six phase windings, and a common-mode capacitor, the method comprising:
- generating, by the speed controller of the dual-three-phase motor machine, a reference current;
- generating, by the current controller of the dual-three-phase motor machine, a reference voltage based on the reference current;
- generating, by the zero-common mode pulse width modulation module of the dual-three-phase motor machine, two groups of pulse width modulated signals;
- providing the two groups of pulse width modulated signals to a paralleled inverter of the dual-three-phase motor; and
- driving, by the paralleled inverter of the dual-three-phase motor machine, the paralleled inverter comprising a first inverter connected to the first windings group and a second inverter connected to the second windings group, first and second windings groups of the dual-three-phase motor via the two groups of pulse width modulated signals as a motor drive to the six phase windings to generate a zero common-mode pulse width modulation across the first and second windings groups,
- wherein the common-mode capacitor is between the common-neutral connection and a ground,
- wherein the common-neutral connection comprises a first neutral connection connecting the first windings group and a second neutral connection, which is separate from the second neutral connection, connecting the second windings group,
- wherein the zero common-mode pulse width modulation provided by the paralleled inverter utilizes the reference voltage generated by the current controller and comprises a triangle relationship defined by:

$$\frac{V_{ref}T_s}{\sin(2\pi/3)} = \frac{V_{dc}t_1}{\sin\theta} = \frac{V_{dc}t_2}{\sin(\pi/3 - \theta)},$$

where t1 and t2 are two vectors corresponding to the first and second windings groups, Vref is the reference voltage with a position of angle θ, and Ts is a switching period,
- wherein a voltage of the common-mode pulse width modulation is zero or negligible due to the triangle relationship,
- wherein each winding of the first windings groups corresponds to and is in-phase with a winding of the second windings group.

7. The method of claim 6, wherein the first and second windings groups form a three-phase, 120° phase-shift machine.

8. The method of claim 6, wherein the first and second windings groups are physically distributed in two segments of a stator of the dual-three-phase motor.

9. The method of claim 6, wherein the first and second windings groups have an identical back-electro-magnetic-force for each winding pair.

10. The method of claim 6, wherein the dual-three-phase motor is included in a ropeless elevator system.

* * * * *